Sept. 11, 1934.                A. KOTTMANN                1,973,437
              CALCULATING MACHINE WITH AUTOMATIC MULTIPLYING DEVICE
                    Filed Feb. 7, 1934          7 Sheets-Sheet 1

INVENTOR:
August Kottmann
BY
ATTORNEY.

Sept. 11, 1934.  A. KOTTMANN  1,973,437
CALCULATING MACHINE WITH AUTOMATIC MULTIPLYING DEVICE
Filed Feb. 7, 1934  7 Sheets-Sheet 2

Fig. 3.

INVENTOR:
August Kottmann
BY
ATTORNEY.

Fig. 4

Sept. 11, 1934.  A. KOTTMANN  1,973,437
CALCULATING MACHINE WITH AUTOMATIC MULTIPLYING DEVICE
Filed Feb. 7, 1934   7 Sheets-Sheet 5

Sept. 11, 1934.  A. KOTTMANN  1,973,437
CALCULATING MACHINE WITH AUTOMATIC MULTIPLYING DEVICE
Filed Feb. 7, 1934    7 Sheets-Sheet 7

Inventor:
August Kottmann
By [signature]
Attorney

Patented Sept. 11, 1934

1,973,437

UNITED STATES PATENT OFFICE 1,973,437

CALCULATING MACHINE WITH AUTOMATIC MULTIPLYING DEVICE

August Kottmann, Sommerda, Germany, assignor to Rheinische Metallwaaren- und Maschinenfabrik, Dusseldorf-Derendorf, Germany, a corporation of Germany Application February 7, 1934, Serial No. 710,198
In Germany April 30, 1930

4 Claims. (Cl. 235—61)

The present application is a continuation in part of applicant's co-pending application, Serial No. 528,105, filed April 6, 1931.

The invention relates to calculating machines with automatic multiplying device wherein both factors of a multiplication operation can be introduced into the machine by means of a single keyboard, and in which both factors of the multiplication operation are first set into the same presetting device (for example in the setting pins of a pin carriage) and only then are transferred to the members which are to be set, either to the register drive gears or to the multiplying device. In known calculating machines of this type the transfer of the digit values from the presetting device to the setting means of the multiplying device or the register drive gears is accomplished by means of the register drive gears, while on the contrary in the machine according to the invention a special gear means, independent of the register drive gears and serving exclusively for transferring the digit values, is provided.

After the presetting of the numerical value in the presetting device one of two selecting keys is depressed, one of which causes transfer to the multiplying device and the other the transfer to the register drive gear.

The transfer device may be so arranged that immediately after completion of the transfer it again clears the previously set numerical value.

The arrangement in accordance with the invention has many advantages with respect to known devices for setting both factors by means of a single keyboard. For example, in the arrangement in accordance with the invention it is immaterial whether the setting of the register drive gears or that of the multiplying mechanism is undertaken first, while this is not the case in the known devices. Furthermore, in case of carrying through a plurality of multiplications with one factor which remains unchanged, in the arrangement according to the invention this unvarying factor, which then is set in the register drive gears as the multiplicand—will remain set, after completion of the multiplication, for the succeeding multiplications, whereas in the known devices it is always necessary to set both factors anew before each multiplication. Finally with the device in accordance with the invention, during the calculation of a product, one of the factors of the next multiplication may already be set into the presetting device, so that after completion of the calculation it may be transferred into the multiplying device by only a single pressure on one of the selecting keys, which is particularly advantageous when one factor remains unchanged in a plurality of successive multiplications, and only one factor needs to be set anew. A reset mechanism, however, clears the setting device before a new value is set in the device. Furthermore, in the arrangement and construction of the individual parts in accordance with the invention there is obtained an extremely small, light, compact and convenient key-type calculating machine, provided with all the usual setting means.

One embodiment of the invention is shown in the accompanying drawings and described in the present specification.

The setting pins 1 are set by the keys 2 whose key levers move the intermediate levers 4 which rotate about the shaft 3 and which by means of their hammer-like heads 4a force the setting pins 1 out of their position of rest.

Figure 1:
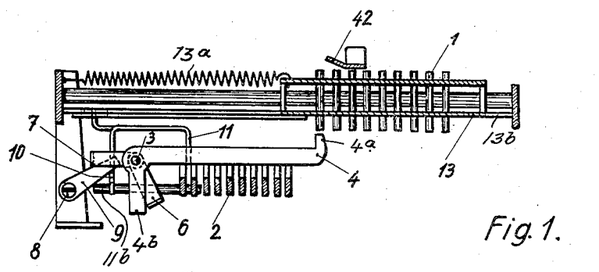
Figure 1 is a side elevation of the setting element carriage with the setting elements, partly in section.
Figure 2:
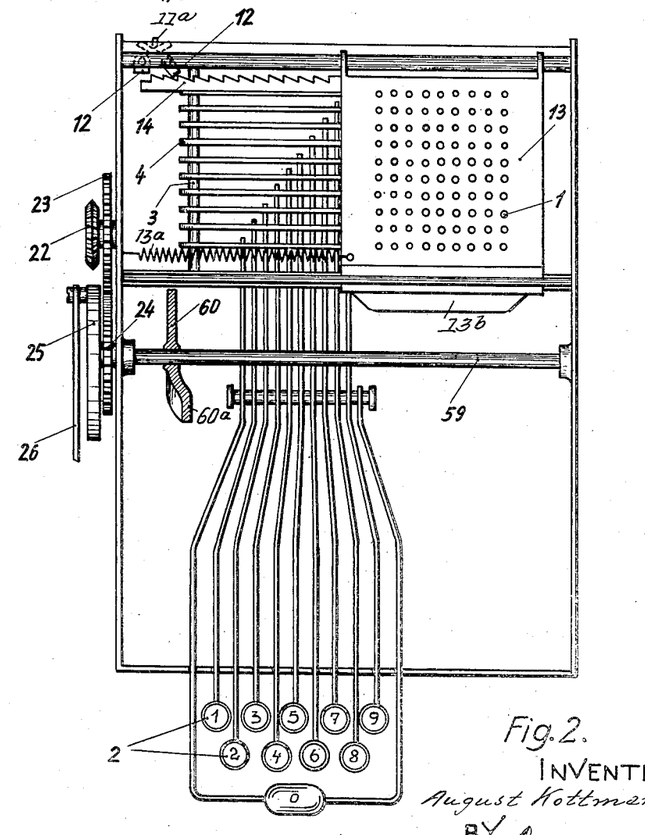
Fig. 2 is a top view showing the setting element carriage and the keyboard.
Figures 7, 11, 12, 13, 14, 16:
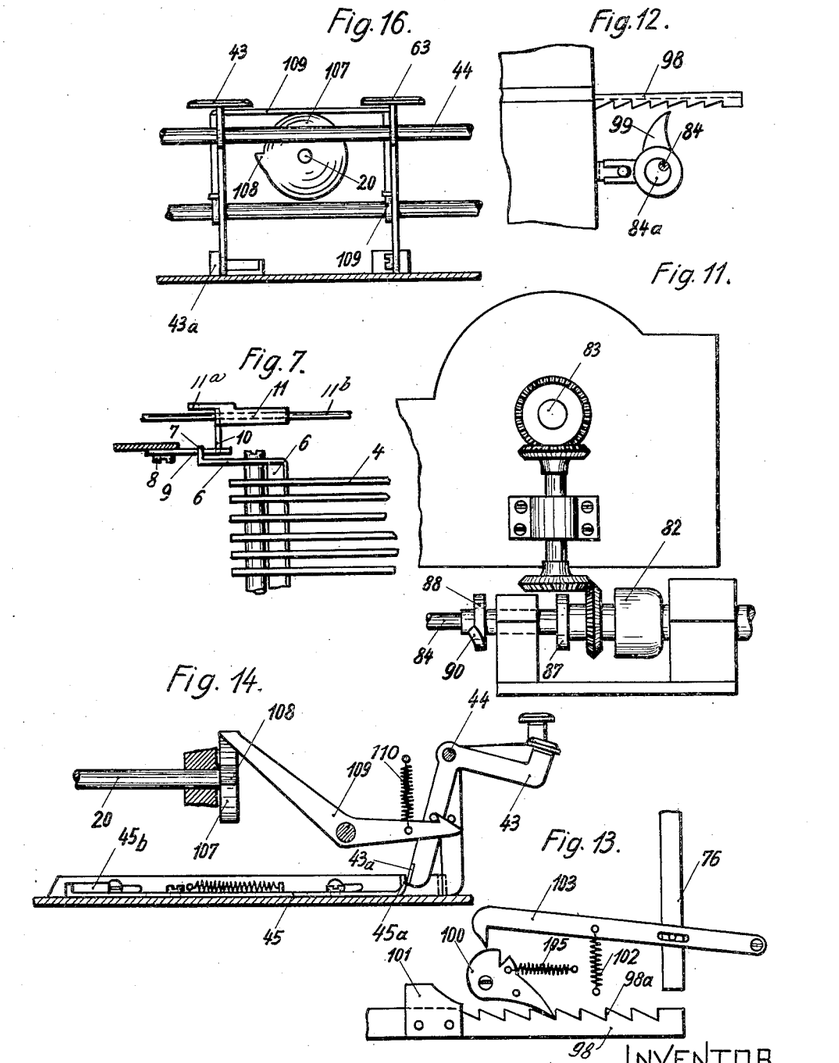
Fig. 7 is an elevation of a switching device for moving the setting element carriage.
Fig. 11 is a detail elevation of the moving device for the register operating gearing of the calculating machine.
Fig. 12 is a detail elevation of the drive means for moving the register mechanism.
Fig. 13 is an elevation of a locking pawl for the rack bar of the register mechanism moving means.
Fig. 14 is a partly sectional elevation of the selecting key which causes the engaging of the clutching elements to transfer values to the register drive means.
Fig. 16 is an elevation of a latching and unlatching device for both selecting keys.

If one of these intermediate levers 4 is lifted by means of the keys 2, then the short arm 4b thereof will press against the bail 6, likewise moving about the shaft 3. The said bail 6, by means of its angle-shaped end 7 and the pawl 9 engaged thereby and which is oscillatable about the screw 8, will turn the angle bail 11 around the shaft 11b (Figs. 1 and 7). This in turn actuates, by its upstanding arm 11a, the anchors 12 which engage in the rack bar 14 (Fig. 2) and thus causes the pin carriage 13, driven by a spring 13a, to move into the next decimal position.

Figure 3:
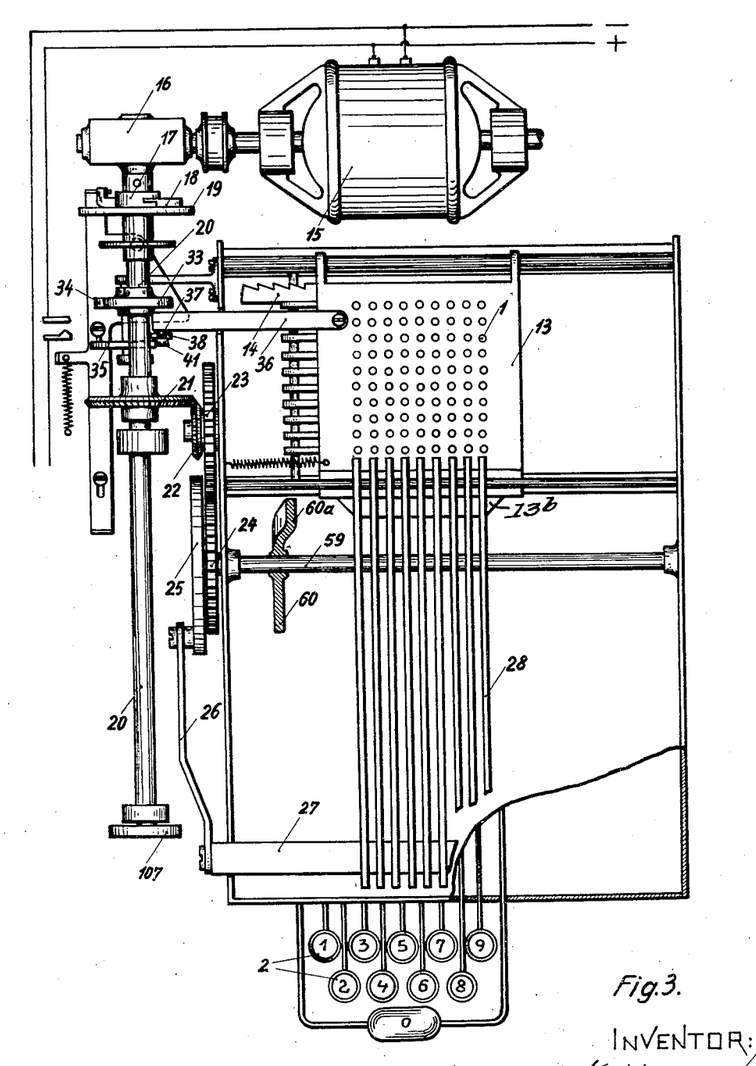
Fig. 3 is a plan view of the operating means for the rack bars which transfer the numerical values.

Corersponding to the number of rows of setting pins, there are rack bars 28 (Figs. 3, 5) supported above the pin carriage 13, which have downwardly extending portions 28a which abut against a slide element 27. The slide element 27 is set into horizontal reciprocating pendulous movement by the motor 15, supported behind the calculating machine, through the gearing 16, drive element 17, clutch pawl 18, clutch disc 19, shaft 20, bevel gears 21, 22, gear wheels 23, 24, crank disc 25, and connecting rod 26.

Figure 5:
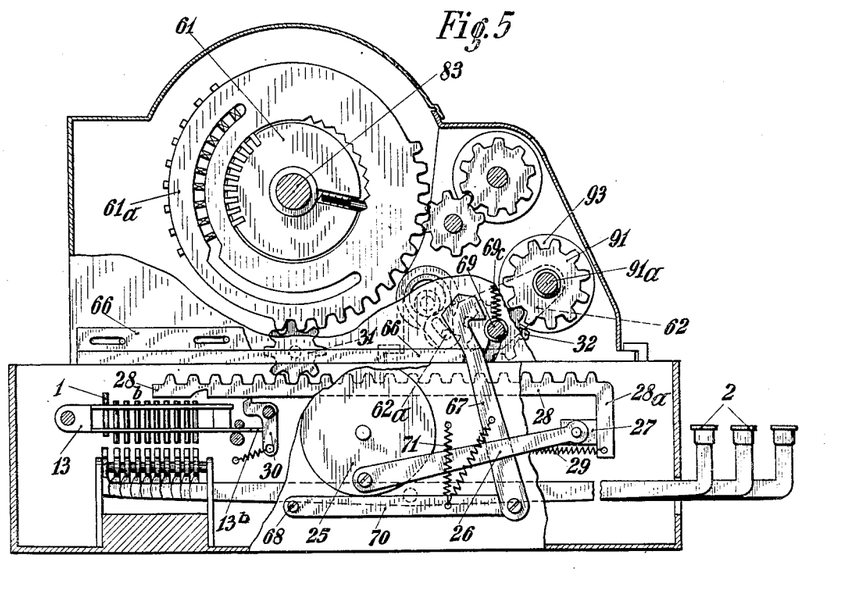
Fig. 5 is a partly sectional side elevation of the calculating machine.

In the position of rest of the drive shaft 20 the slide element 27 in Fig. 5 normally lies at the extreme right. It moves to the left only upon the first half revolution of the crank disc 25, and returns into the initial position upon the second half revolution.

The rack bars 28 are drawn to the left by the springs 29 and are thereby in position to follow the movements of the slide elements 27, in case they are not secured in the initial position by the latch 30 provided for each rack bar.

Figure 6:
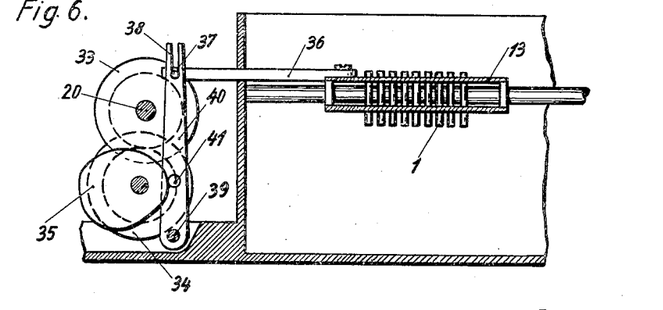
Fig. 6 is a sectional detail elevation of the back-setting and zero-setting device of the setting element carriage.

The latches 30 are disengaged by a projection 13b, Figs. 1 to 3 and 5, on the setting pin carriage 13, in the lateral shifting of the latter, in such way that always only those rack bars under which rows of setting rods or pins lie can follow the slide element 27. (See Figs. 5 and 6.) When the carriage 13 shifts laterally, only those latches 30 which lie above it will be actuated thereby.

If any setting pin 1 in the pin carriage 13 is struck by means of the keyboard 2, the same will project into the field of movement of the rack bar 28 lying above the same. If the slide element 27 is now set into motion by means of the crank disc 25 and connecting rod 26, the rack bar 28 will follow the same until it abuts with its end 28b against the setting pin 1, whereby the magnitude of movement of the rack bar 28 constitutes a measure for the numerical value at that time coresponding to the setting pin 1.

Over each of the rack bars 28 which provide for transferring the values preset in the setting pins selectively either into the calculating drive wheels 61 or into the multiplication mechanism 62, etc., there are two sets of gear wheels 31 and 32, (Fig. 5), one set of which is adapted to be placed in engagement with the tooth segments 61b of the setting discs 61a of the pin wheels 61 (register drive gears) and the other with the elements 91 of the multiplying device which are to be set. As selected the one set or the other may be brought into engagement with the rack bars 28 upon the return of the slide element 27 and the latter, so that upon the return of the rack bars their movement corresponding to the preset numerical value would be transferred either to the register drive means or to the multiplying device. Hereinafter it will be further explained how these gear wheels 31 and 32 are brought into or out of engagement with the rack bars 28.

A bar 36 (Figs. 3, 6) is secured to the pin carriage 13 and engages, by means of a rod 37, into the fork 38 of a shift lever 40, arranged rotatably about the shaft 39. Upon the lever 40 there is a lug 41, which, as soon as the setting element carriage 13 moves to the left during the setting operation, enters into the vicinity of the cam 35, moved by the shaft 20, through the gear wheels 33, 34, so that the setting element carriage 13 is again pressed back into the initial position by this cam after completion of the digits transfer. The inclined surface 42 (Fig. 1) provided over the setting element carriage 13, below which the setting rod carriage 13 passes on the return, provides for "clearing" or restoring the pins 1.

Figure 4:
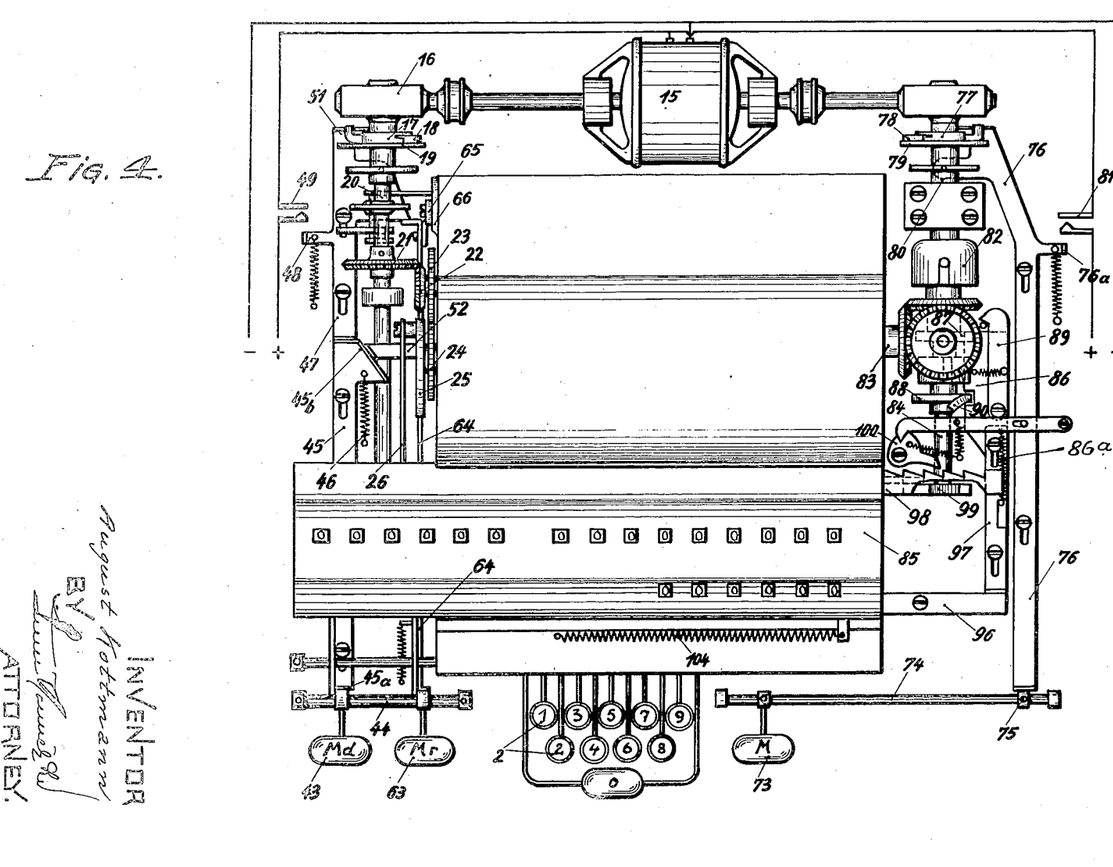
Fig. 4 is a plan view of a calculating machine in accordance with the invention with the drive and control elements exposed to view.

When the setting of the value in the setting pin carriage 13 has been accomplished and the transference of the same to the register drive mechanism as a multiplicand is desired, then the "multiplicand" key 43 (Figs. 4, 14, 16) arranged in front of the machine, designated "Md", should be actuated. The key 43 is pivoted about the shaft 44 and is so constructed that upon depressing it its end 43a presses against the surface 45a of the slide bar 45 and shifts the same against the force of the spring 46 (Fig. 4). The slide bar 45 on the one hand carries along the bar 47, which by means of the projection 48 closes the switch 49 for supplying current to the motor 15 and by means of its end 51 releases the clutch pawl 18 and thereby provides connection between the driver 17 and the clutch disc 19 so that now the motor 15 will set the shaft 20 into rotation.

Figure 8:
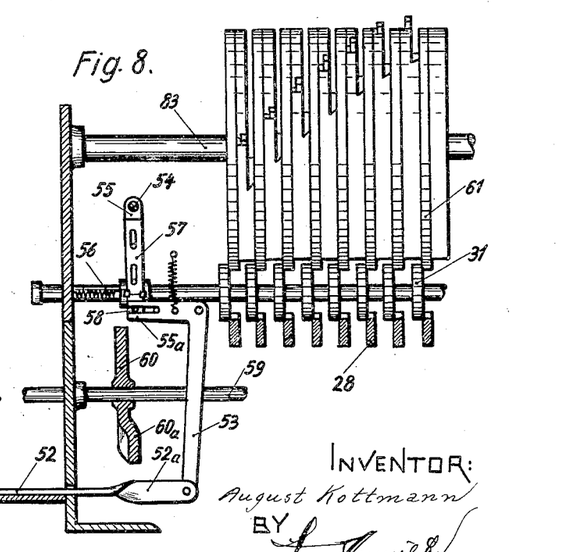
Fig. 8 is a partly sectional elevation of the clutch device between the rack bars and the setting discs of the stepped wheels.

The slide bar 45 simultaneously forces the slide element 52 to the right by means of the incline 45b and thereby shifts the angle lever 53 (Fig. 8).

The fork-like end 55a of the angle lever 53 encompasses the rod 58 of the latch 57, which is shiftable on the lever 55 pivotally arranged about the point 54. The lever 55 is connected with the shaft 56 by suitable means in such manner that it is capable of shifting the latter for a desired distance into the direction of its length, when it itself is moved. When the latch 57 of the angle lever 53 in Fig. 8 is moved downward, it projects into the field of action of the cam 60, rotating with the shaft 59. Shaft 59 is operated by the gear wheel 24 already mentioned. If the shaft 59 and thereby the cam 60 be set into rotation, then during the second half of the revolution, that is, during the return of the rack bars 28, the latch 57, the lever 55, and the shaft 56 are forced to the right by the bulge 60a, so that the gear wheels 31 (Fig. 5) set upon the shaft 56 will come into engagement with the tooth segments 61b of the setting discs 61a of the pin wheels 61 and with the rack bars 28, and thus provide a possibility of transferring from one part to the other. The numerical value preset in the setting pin carriage is therefore transferred to the register drive mechanism.

Upon an extension of shaft 20 there is provided a cam disc 107 (Figs. 3, 14, 15, 16) with a tooth 108. The latter is so arranged that after one revolution of the shaft 20 is nearly completed it lifts the latch bail 109, which by means of spring 110 secures the depressed key 43 in such depressed position, and thereby releases the key. At the instant that the key 43 is released, all the devices affected thereby are returned to their initial positions by means of suitably arranged springs. The shaft 20 driving the rack bars 28 therefore makes only one revolution, toward the end of which also the clutching wheels 31 providing the connection between the transfer rack bars 28 and the setting discs 61 of the stepped wheels are again disengaged. They may subsequently be returned to their initial positions by any suitable means such as disclosed, for instance, in German Patent No. 546,456. The operation of the reset mechanism of this German patent, as applied to the present machine, operates in the following manner:

Any one of the racks 28 (which is the same as the rack 8 in the German patent), after depression of the multiplicand key, moves first to the left (Fig. 5) until it encounters the projected pin 1; during this stroke the pinion 31 is disengaged and the setting disc 61a is not actuated by the rack, also the slide 27 (corresponding to the slide 8a of the German patent) swings the clearing sector 18 (Fig. 1 of the German patent) to rotate the clearing bail 12 downwardly. This bail, which lies adjacent the front of the first tooth of the disc, immediately on depression of the multiplicand key, was shifted by the mechanism 1, 2, 3, 9, 10, 11, 12, to bring the teeth between the openings 14 in the bail into line with the discs 7a (61a). Therefore, the initial downward swing of the clearing bail 12 will zeroize any shifted setting discs during the left stroke of the rack 8 (28) and the ensuing right or effective stroke of the rack will operate upon cleared setting discs. It will be understood that the bail 14 has a constant arc of movement sufficient to zeroize a fully displaced setting disc 61a, viz. to move it from 9 to 0. Setting discs having a lesser displacement are picked up at a later point in the swing of the bail 14 and carried to zero position thereby.

If the transfer of the value preset in the setting element carriage is to take place into the multiplier mechanism 91, that is, if the value is to be used as a multiplier, then the "multiplier" key 63 (Figs. 4, 15, 16) designated "Mr" is depressed. From this key the switch controlling the motor is closed through the connecting element 64, just as in the previously described key 43, and the clutch pawl 18 is released, that is, the drive is put in action. The member 64, as shown in Fig. 4, has at its rear end a projection 64a extending to the left, which abuts against the projection 47a of the slide bar 47. Furthermore, the lever 65 (Figs. 4 and 15) is so oscillated and the slider 66 so carried along, by the key 63, that the latter, as Fig. 5 shows, presses the hook 67 against the shaft 69 carrying the gear wheels 32.

The hook 67 (Fig. 5) is set into up-and-down swinging motion by means of the cam disc 25 and the lever 70, pivoted at the point 68, which is pressed against the said cam by the spring 71 in such manner that during the second half of the revolution of the cam disc 25, that is, during the return of the slide element 27 and the rack bars 28, it draws the shaft 69 downwardly and brings the gear wheels 32 into mesh with the rack bars 28. Inasmuch as the gear wheels 32 on the other hand are in engagement with the elements 91 of the multiplying device which are to be set, the numerical value preset in the setting pins is transferred into the multiplying device.

The gear wheels 32 do not come out of mesh with the gear wheels 91 inasmuch as the shaft 69 of the gear wheels 32, as well as the shaft 91a (see Fig. 5) of the gear wheels 91, and number wheels 93 are mounted in two links 62, which in turn are swingably mounted at 62a internally on the side walls of the housing of the registering mechanism. The spacing of the shafts 69 and 91a is therefore unchangeable. Both shafts are swung downwardly by the hook 67.

The hook 67 lies closely adjacent the left side wall of the machine frame in substantially the same plane as the crank discs 25, (see Fig. 4) thus rather far to the left. It projects from below into the housing 85 of the registering mechanism which is open below. The number wheels 93 and the gear wheels 91 and 32 lie rather far to the right in the housing of the register, as may be seen from the location of the peep holes 93b (Fig. 4). The portion of the shaft 69 which comes into engagement with the hook 67 is therefore free from gear wheels 32 and can freely slide through under the hook 67 when the register mechanism shift.

The locking pawl for the key 63 will be released after completion of the transfer, by the same device which releases the multiplicand key 43. The elements depending on the key 63 will return to their previous positions, while the supply of current to the motor is interrupted as soon as the key is released. Thus also in this transfer the shaft 20 completes only one revolution and the rack bars 28 make only a single to-and-fro motion.

After the setting of the values in the setting element carriage and their transfer into the calculating machine has been completed in the above described manner, the key 73 (Fig. 4) designated "M" is used, whereby by means of the shaft 74 and the rod 75 the position of the slide 76 is so changed that it releases the clutching pawl 78 and thereby connects the driver 77 and the clutch disc 79 together and simultaneously closes the switch 81 so that the current is supplied to the motor 15. Thus the shaft 80 is driven.

By means of a known differential drive means 82 the rotations of the shaft 80 are selectively transferred to one of the other two shafts 83 and 84. Shaft 83 moves the calculating drive means 61, whereas shaft 84 actuates the register shifting mechanism 85. The differential 82 is controlled by a locking element 86 carried in the subframe. This locking element 86 cooperates with two opposed locking elements 87 and 88 (Figs. 4, 11) of the differential shafts in such manner that when it comes out of engagement with one of the opposed locking elements it immediately is in engagement with the other, so that one of the two differential shafts is always free while the other is locked. Upon the locking element 88 there is provided a tooth 90, which, upon the assumption that the corresponding member is freed for a movement by the locking slide bar 86, toward the end of each revolution again so shifts the said locking slide bar that the shaft 84 is again locked. The shaft 84 is therefore always free only to the extent of one revolution.

Figures 9, 17, 18, 19:
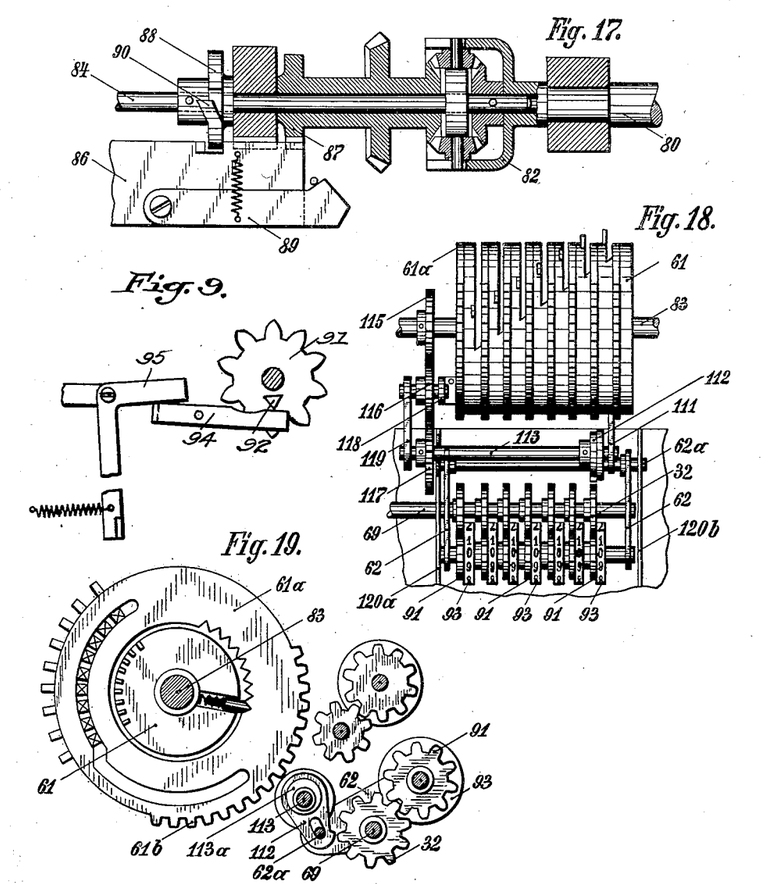
Fig. 9 is a detail side elevation of the control of the drive device for the moving of the register mechanism.
Fig. 17 is a detail view, partly in central longitudinal section, showing the differential mechanism of Figs. 4 and 11 on a larger scale.
Fig. 18 is an end view partly in section of the setting discs and associated parts.
Fig. 19 is a side view of Fig. 18.
Figure 10:
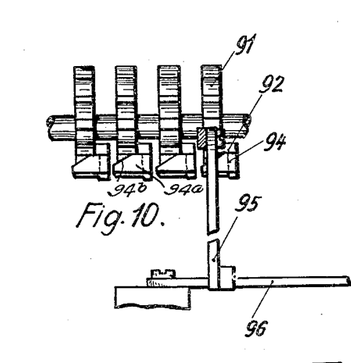
Fig. 10 is a rear elevation of the control means illustrated in Fig. 9.
Figure 15:
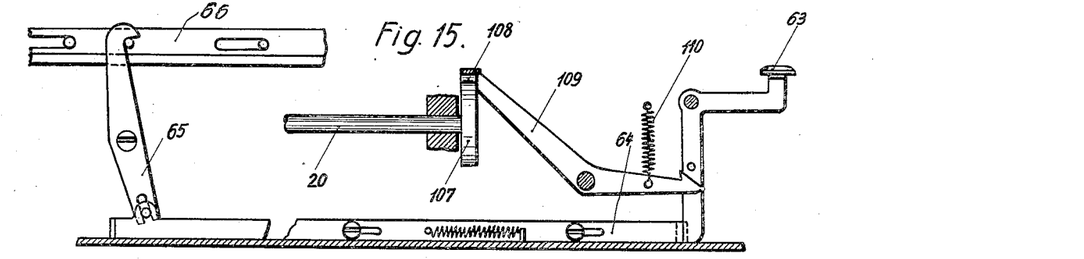
Fig. 15 is a partly sectional elevation of the selecting key which causes the engaging of the clutch elements of the multiplier mechanism.

The slide bar 86 is actuated by the gear wheels 91 of the multiplying mechanism 62 (Figs. 4, 9, 10).

Small shifting lugs 92 (Figs. 9, 10) are secured to the gear wheels 91, which depress the lever 94 when the numeral disc 93 secured to the gear wheel 91 passes from "one" to "zero". The lever 94 swings the angle lever 95 to such extent that the latter, through an intermediate member 96 (Fig. 4), moves longitudinally a slide bar 97 arranged upon the previously mentioned locking slide bar 86, and thereby carries along the locking slide bar 86 in its movement, by means of the spring 86a. The yieldable connection of the slide bars 86 and 97 (through spring 86a) provides, in case any place of the multiplier is equal to "zero", so that the register mechanism moving device must be twice successively engaged, and the shaft 84 must make two successive revolutions, whereby the slide bar 97 (Fig. 4) stands in the upwardly shifted position during two revolutions, yet the slide bar 86 in Fig. 4 may transiently be shifted so far downwardly that the tooth 90 can pass through the notch of the slide bar 86 provided for the same. The register mechanism moving device of the calculating machine, as seen from Fig. 12, consists of a rack bar 98 secured to the register carriage in the ratchet teeth of which engages a moving pawl 99 operated from the shaft 84 through the eccentric 84a so that in case the shaft 84 runs free, upon every revolution of the same the carriage will be carried on for one decimal place.

After each movement of the register mechanism through one place a locking pawl 100 (Figs. 4, 13) falls into a second row 98a of teeth arranged laterally of the rack bar 98 from tooth to tooth and secures the carriage in its position at the moment.

If the carriage moves beyond the position intended for the last place, then a cam 101 forces the locking pawl 100 out of the ratchet teeth while simultaneously a further pawl 103 under the tension of the spring 102 secures it in the uninclined position, so that after completion of the calculation the carriage is automatically drawn back into the initial position by means of the spring 104 and stands ready for a further calculating operation. Upon pressing the key 73 for a new calculation operation the pawl 103 is removed from its locking position by the bar 76, so that the locking pawl 100 again falls into the ratchet teeth 98a through the tension of spring 105.

Figure 20:
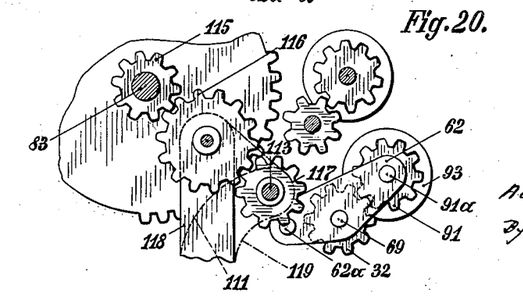
Fig. 20 is a side view of further details associated with the setting discs.

The machine operates as follows in calculating a product:

The gear wheels 32 which are in engagement with the adjusted elements 91 of the multiplying device come into engagement in order, due to the shifting of the register mechanism, with a transporting pawl 112, Figs. 18 and 20, arranged unshiftably in the frame of the machine, which is made similarly to the transporting pawl 99 of the register mechanism moving device. This transporting pawl 112 is moved by means of gear wheels 115, 116, and 117, the shaft 113 and the eccentric disc 113a by the drive shaft 83 of the register drive mechanism 61 and is guided by an elongated slot on the shaft 62a. The pawl 112 together with its drive is non-slidably mounted in the frame of the machine.

The shaft of the intermediate wheel 116 and the shaft 113 are mounted in the frame of the machine by means of holders 111, 118 and 119 whereby the shaft 62a is mounted in the intermediate walls 120a and 120b of the register housing.

The shaft 113 rotates at the same speed as the shaft 83 so that upon every revolution of the shaft 83 the pawl 112 turns the wheels 32 and 91 to an extent corresponding to the numerical value "one" back toward the zero position. Thus if previously the gear wheel 91 and the number wheel 93 were set to correspond to the numerical value 5, then upon the fifth rotation the number disc will pass from "one" to "zero" and the register shifting mechanism is released. After the multiplicand set in the register drive mechanism has been added five times in the "result" mechanism, therefore the counting mechanism carriage moves further to the extent of one place so that now the next wheel 32 comes into engagement with the transporting pawl. In this position of the register mechanism again as many additions are carried out as correspond to the setting of the number wheel 93, now moved by the transport pawl, whereupon the register mechanism shifting mechanism is again released etc., until all the number wheels 93 are set to "zero". For those gear wheels which are set to correspond to the digit "zero", only a movement of the carriage takes place. When the calculation has been carried out and the carriage has reached the end position, then as already stated the release of the latching pawl 100 takes place together with the return of the carriage into the initial position.

If a "zero" is contained at any place whatever of the multiplier which has been introduced, so that the lever 94 which corresponds to the multiplier setting member which has been set to correspond to zero in this place, is raised ab initio, then at the instant that this said multiplier setting element which indicates a zero goes into action, the inclined part 94b, of the lever 94, enters under the horizontal arm of the angle lever 95. Thereby the shifting means for the register is immediately put into engagement.

The levers 94 are bent around at the end, to form tongues or lugs 94a projecting to the left, as shown in Fig. 10. These tongues have the inclined parts 94b, above mentioned, upon the left side.

The fact that a new setting of values can already be undertaken in the setting element carriage, while the calculating machine is still carrying out the calculating process, inasmuch as the previously set numerical value is cleared immediately after the transfer, should not remain unmentioned.

While a prefered embodiment of the present invention has been described in detail and illustrated in the accompanying drawings, it is to be understood that the drawings are for the purposes of illustration only and are not designed as a definition of the limits of the invention, reference being had for this purpose to the appended claims.

I claim as my invention—

1. A calculating multiplying machine with a single keyboard, and wherein both factors are introduced into the calculating machine by said single keyboard, comprising a single set of setting pins cooperating with said keyboard, a register operating means and a multiplier device, and means for selectively transferring the adjustments of the setting pins either to the register operating means or to the multiplier device.

2. A calculating machine which comprises a setting pin carriage, setting pins in said carriage, a register operating means, a register, a multiplier device for automatically controlling multiplication, a keyboard, means cooperating with the keys thereof to set the said pins, means for transferring digit values set up on said pins selectively to either the register operating means or the multiplier device, and two additional keys controlling this selection.

3. A calculating multiplying machine with a single keyboard, and wherein both factors are introduced into the calculating machine by said single keyboard, a single set of setting pins adapted to be pre-set by the keyboard, a carriage carrying said pins, a plurality of rack bars cooperating with the thus pre-set setting pins and movable through ranges determined by this pre-setting, a register, register operating means, a multiplying device, a motor, drive connections between said motor and the rack bars, coupling means between the rack bars and the register operating means, coupling means between the rack bar and the multiplying device, and means for selectively engaging either of said coupling means while the coupling means for the other is disengaged.

4. A multiplying machine, comprising a ten key keyboard, a set of digital setting pins, means actuated by the keyboard for presetting the pins according to the digits of a factor, a register, ordinal actuators for the register, a multiplier device to control a number of operations of the actuators, and means for transferring the digits set up on said pins selectively to either the register actuators or the multiplying device.

AUGUST KOTTMANN.